United States Patent
Gnech et al.

(10) Patent No.: US 9,652,480 B2
(45) Date of Patent: May 16, 2017

(54) BACKUP MANAGEMENT OF SOFTWARE ENVIRONMENTS IN A DISTRIBUTED NETWORK ENVIRONMENT

(71) Applicant: INTERNATIONAL BUSINESS MACHINES CORPORATION, Armonk, NY (US)

(72) Inventors: Thomas H. Gnech, Boeblingen (DE); Steffen Koenig, Boeblingen (DE); Oliver Petrik, Boeblingen (DE); Petra Wagner, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 14/045,975

(22) Filed: Oct. 4, 2013

(65) Prior Publication Data

US 2014/0101109 A1    Apr. 10, 2014

(30) Foreign Application Priority Data

Oct. 9, 2012  (GB) .................................. 1218052.7

(51) Int. Cl.
  *G06F 17/30* (2006.01)
  *G06F 11/14* (2006.01)
(52) U.S. Cl.
  CPC .... *G06F 17/30309* (2013.01); *G06F 11/1448* (2013.01); *G06F 2201/80* (2013.01)
(58) Field of Classification Search
  None
  See application file for complete search history.

(56) References Cited

U.S. PATENT DOCUMENTS 5,519,855 A * 5/1996 Neeman ............ G06F 17/30067
6,016,501 A * 1/2000 Martin ............... G06F 17/30581
(Continued)

FOREIGN PATENT DOCUMENTS

CN        101576849 A      11/2009

OTHER PUBLICATIONS

"intrinsic content unit"—Google Search Aug. 26 15, Google.com, https://www.google.com/?gws_rd=ssl#q=%22intrinsic+content+unit%22.*

(Continued)

*Primary Examiner* — Jason Liao
(74) *Attorney, Agent, or Firm* — Heslin Rothenberg Farley & Mesiti P.C.

(57) ABSTRACT

Backup management of software environments in a distributed network environment includes: Creating a platform specific software environment according to a predefined software environment definition by a user in the network environment; automatically creating a generalized backup of the software environment by extracting platform independent data contents and platform specific transformation rules; automatically calculating enhanced meta data describing the generalized backup; assigning the enhanced metadata with the predefined software environment definition; registering the generalized backup with the enhanced metadata in a backup storage accessible by a plurality of distributed users connected via said network environment, creating a software environment according to a predefined software environment definition by automatically checking the backup storage for an available generalized backup by means of the predefined software environment definition.

7 Claims, 9 Drawing Sheets

(56) References Cited

U.S. PATENT DOCUMENTS

| | | | |
|---|---|---|---|
| 7,958,495 B2 | 6/2011 | Kelso | |
| 8,209,290 B1* | 6/2012 | Dowers, II | G06F 17/30289 |
| | | | 707/640 |
| 2006/0053305 A1* | 3/2006 | Wahlert | G06F 11/1451 |
| | | | 713/189 |
| 2006/0218435 A1* | 9/2006 | van Ingen | G06F 11/1451 |
| | | | 714/6.12 |
| 2008/0147621 A1 | 6/2008 | Newman | |
| 2012/0017114 A1* | 1/2012 | Timashev | G06F 11/1469 |
| | | | 714/15 |

OTHER PUBLICATIONS

"enhanced metadata"—Google Search Aug. 26 15, Google.com, https://www.google.com/?gws_rd=ssl#q=%22enhanced+metadata%22.*

Eli the Computer Gui, NAS and SAN Introduction, Sep. 26 13, youtube.com, https://www.youtube.com/watch?v=csdJFazj3h0.*

Wigglesworth, Joe et al., "Standardize Image Management with the IBM Virtual Image Library," http://www.ibm.comideveloperworks/cloud/library/cl-virtualimagelibrary/index.html, retrieved from internet Jun. 5, 2013, pp. 1-10.

* cited by examiner

BACKUP MANAGEMENT OF SOFTWARE ENVIRONMENTS IN A DISTRIBUTED NETWORK ENVIRONMENT

PRIOR FOREIGN APPLICATION

This application claims priority from United Kingdom patent application number 1218052.7, filed Oct. 9, 2012, which is hereby incorporated herein by reference in its entirety.

BACKGROUND

One aspect of the present invention relates in general to the field of distributed network environments, and in particular to backup management of software environments in a distributed network environment.

In software product test lab environments it is essential to maintain a high test throughput rate to allow for fast verification of new product releases. The number of required tests increases with each new product release, since new products require regression tests based on older environments for compatibility reasons.

A main inhibitor is the setup of the initial test prerequisites. Thus, testers frequently use the known methods of backup/restore of database contents to save a first setup prerequisite and reuse the saved prerequisite in a second setup.

The problem with that personally efficient work is that the information about available prerequisites is not known in a team environment. This is resulting in redundancy in work efforts and disk space over-consumption within and across teams, no reuse of setup prerequisites between different team members, and disk space clean-up is up to each single tester.

In a usual setup of a test lab for a certain hardware/software using just one platform in a distributed test environment a team is assigned to perform tests for the certain hardware/software platform. The first activity of each member of the team is to set up the test prerequisite on the corresponding platform. Since it is much likely that subsequent tests need the same test prerequisite, it is desirable to keep a backup of the test prerequisite for later reuse. For two different tests, assigned to two different test persons, the same test prerequisite is required. So for two test persons and the same test prerequisites, an individual backup is generated. Since the test prerequisites are the same, the two individual backups are redundant backups. A distributed test environment including multiple platforms has an increasing complexity as the number of platforms increases and, as a consequence, the number of assigned teams increases. The number of redundant backups is now extended over the different individual platforms to result in individual backups as redundant backups for the same test prerequisite.

In the document "Standardize image management with the IBM Image Library Virtual" by Joe Wigglesworth (IBM) and Darrel Reimer (IBM), which is hereby incorporated herein by reference in its entirety, a prior art solution to manage cloud virtual images and metadata is disclosed. In the disclosed solution a virtual image consists of the following parts, which are built on top of each other: First, an optional hypervisor (HV), next, an operating system (OS) with optional installed software (IS), and eventually, optional data. To identify similar virtual images, prior art solutions use hash functions like a locality-sensitive hash (LSH). Two virtual images gain similarity the more parts including their predecessor parts are equal. For example, assume image A consists of hypervisor (HV1), operating system (OS1), installed software (IS1), image B consists of hypervisor (HV1), operating system (OS2), installed software (IS2), and image C consists of hypervisor (HV1), operating system (OS1), installed software (IS3). Comparison of the images results in image A is less similar to image B than to image C. Different hypervisors lead to no similarity, although the operating system or installed software higher level parts on top of them might be similar or even equal. Therefore, similarity between two higher levels parts depends on their lower level parts. Since prior art solutions have to take care of the lower level parts, prior art solutions must take care of different target environments and thus store more and larger virtual images for the same or similar relevant software environment (SWE). Prior art metadata are based on information available through the file system within the virtual image.

The prior art solutions do not teach enhanced metadata and do not teach a method for identifying content units included in the software environment itself. Furthermore, the prior art search results do not teach software environments which are independent from their lower level parts.

BRIEF SUMMARY

A technical problem underlying one or more aspects of the present invention is to provide backup management of software environments in a distributed network environment, which are able to reduce storage consumption of software environment backups and to solve the above mentioned shortcomings and pain points of prior art backup of software environments.

According to aspects of the present invention a method for backup management of software environments in a distributed network environment is provided, as well a system for backup management of software environments in a distributed network environment, a data processing program for backup management of software environments in a distributed network environment, and a computer program product for backup management of software environments in a distributed network environment.

In one aspect, the method includes, for instance, creating a platform specific software environment according to a predefined software environment definition by a user in the network environment; automatically creating a generalized backup of the software environment by extracting platform independent data contents and platform specific transformation rules; automatically calculating enhanced meta data describing the generalized backup; assigning the enhanced metadata with the predefined software environment definition; registering the generalized backup with the enhanced metadata in a backup storage accessible by a plurality of distributed users connected via the network environment, creating a software environment according to a predefined software environment definition by automatically checking the backup storage for an available generalized backup by means of the predefined software environment definition.

The above, as well as additional purposes, features, and advantages of aspects of the present invention will become apparent in the following detailed written description.

BRIEF DESCRIPTION OF THE SEVERAL VIEWS OF THE DRAWINGS

One embodiment of the present invention, as described in detail below, is shown in the drawings, in which.

DETAILED DESCRIPTION

Figure 1:
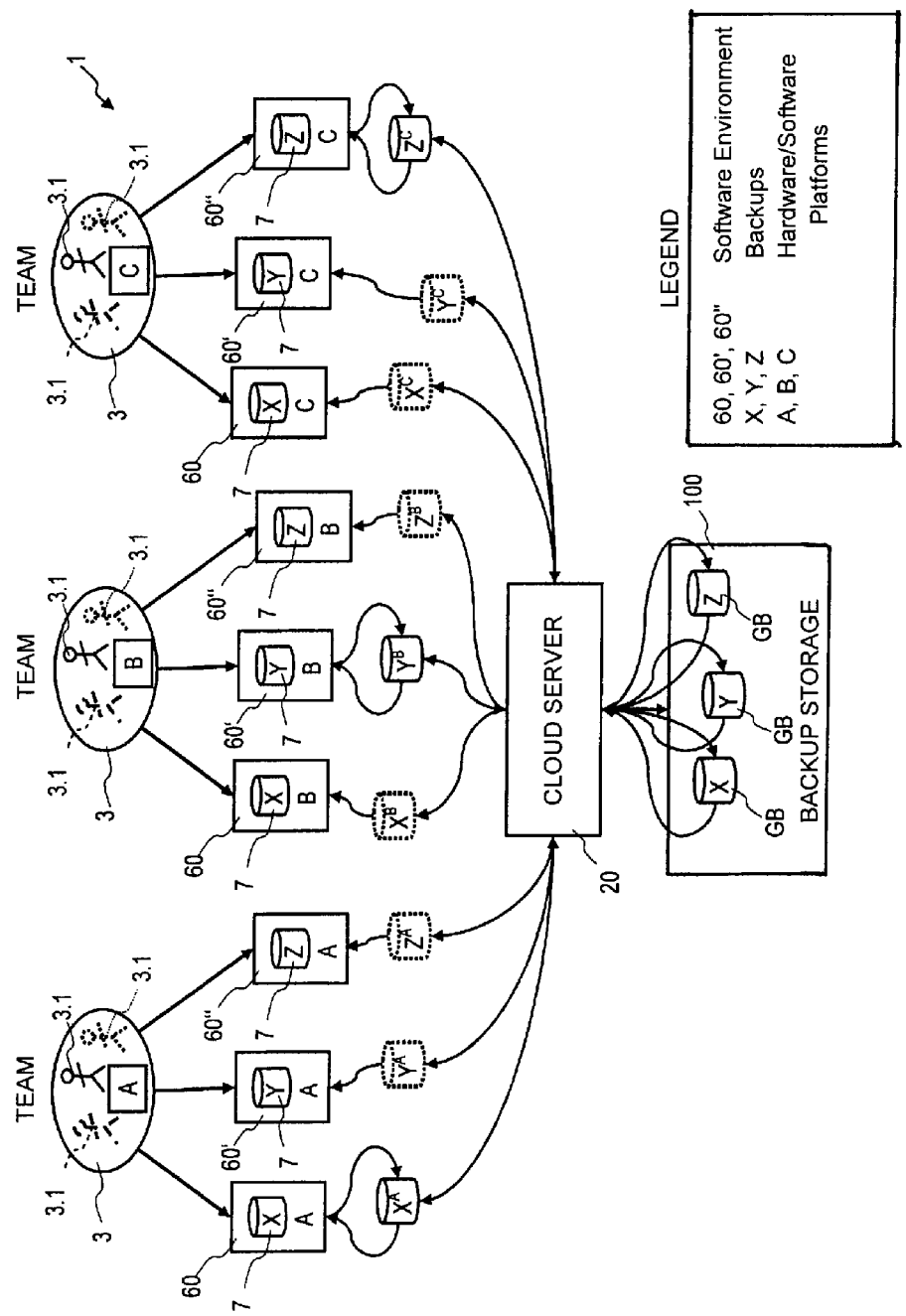
FIG. 1 is a schematic block diagram of a network environment, in accordance with an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
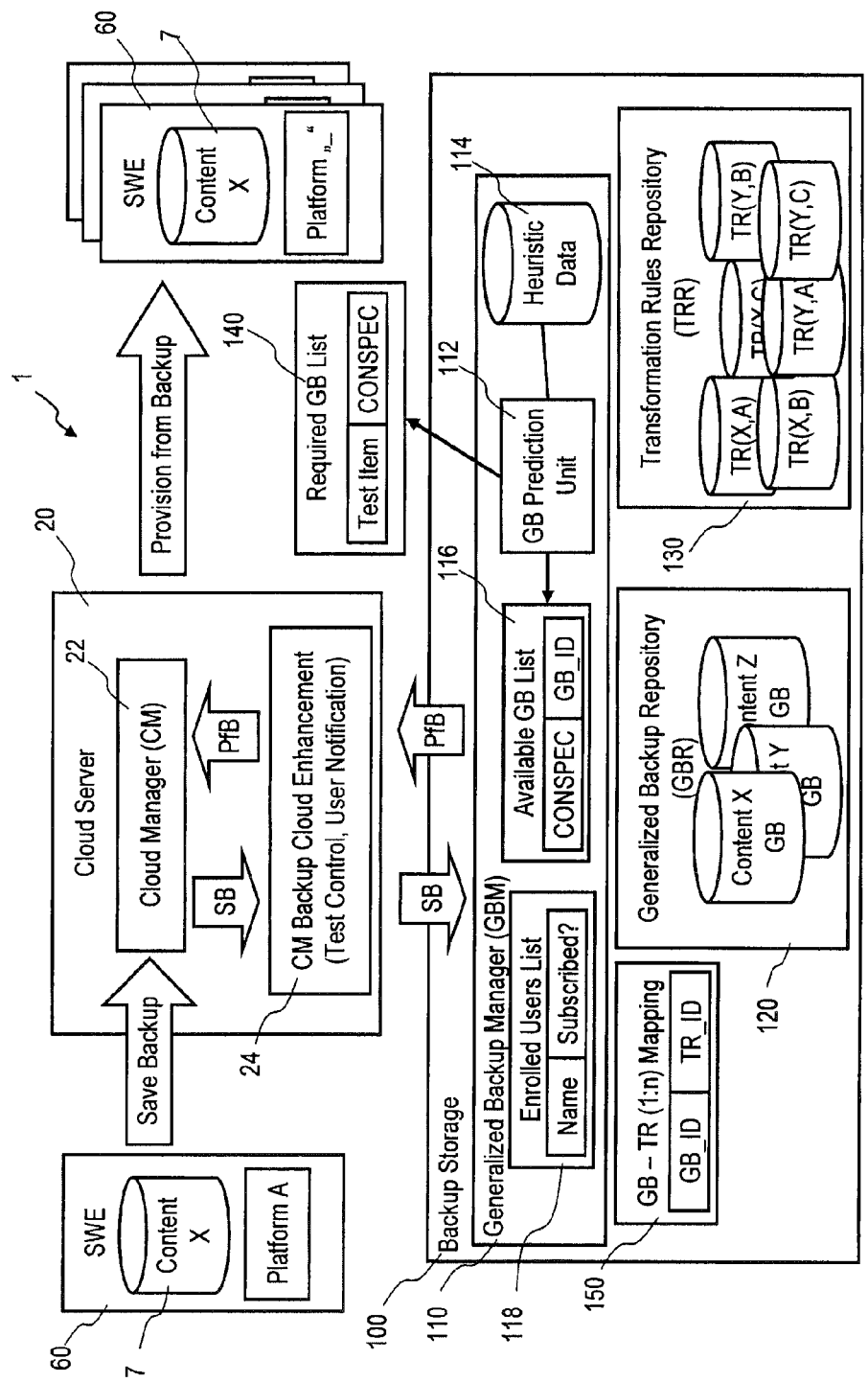
FIG. 2 is a more detailed block diagram of the network environment of FIG. 1, in accordance with an embodiment of the present invention.
Figures 8, 9:
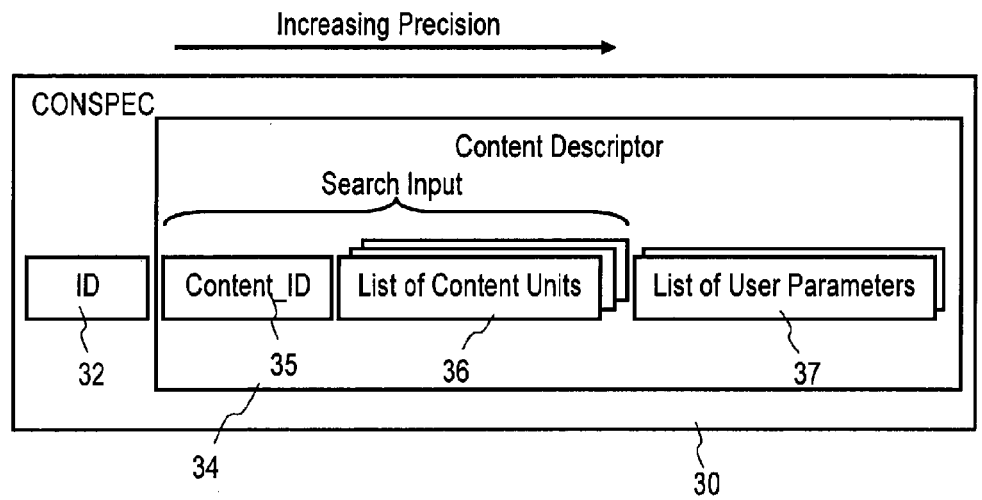
FIG. 8 is a schematic diagram of enhanced metadata referred to as content specification (CONSPEC), in accordance with an embodiment of the present invention.
FIG. 9 is a schematic diagram of an enhanced test matrix, in accordance with an embodiment of the present invention.

FIGS. 1 and 2 show a distributed network environment 1, in accordance with an embodiment of the present invention; and FIG. 8 shows enhanced metadata also referred as content specification CONSPEC 30.

Referring to FIGS. 1 and 2, the shown embodiment of the distributed network environment includes three different hardware/software platforms A, B, C connected to cloud server 20 and a backup storage 100 storing generalized backups GB of reusable test prerequisites managed by a corresponding backup server. Exemplary three teams 3 each having three team members 3.1 are assigned to the network environment 1 to setup software environments 60, 60', 60" and perform tests including specified test content 7 using the three hardware/software platforms A, B, C that means, that each team member 3.1 can use one of the three hardware/software platforms A, B, C to setup a corresponding software environment 60, 60', 60" to perform tests including the specified test content 7. There could be more or less than three teams 3 and also more or less than three team members 3.1 for each team 3 using the network environment 1. The first activity of each team member 3.1 is to setup the test prerequisite for the software environment 60, 60', 60" on the used platform A, B, C. Since it is much likely that subsequent tests need the same test prerequisite, it is desirable to keep a backup $X^A, Y^A, Z^A, X^B, Y^B, Z^B, X^C, Y^C, Z^C$ of the test prerequisites for later reuse.

The cloud server 20 is used for gathering and distributing backup information $X^A, Y^A, Z^A, X^B, Y^B, Z^B, X^C, Y^C, Z^C$ within and among platform test teams 3 for platform A, platform B, and/or platform C. The generalized backup GB is created in a way that it is deployable not only on a system platform A, B, C of the same type the generalized backup GB was created, but also on target platforms A, B, C of any other system platform type.

Referring to FIGS. 1, 2 and 8 the cloud server 20 attaches to the backup storage 100 including a generalized backup storage manager (GBM) 110, a generalized backup repository (GBR) 120, and a transformation rules repository (TRR) 130 to save and retrieve generalized backups GB. The generalized backup GB is split up into two parts. A first part includes platform-independent data contents X, Y, Z of the generalized backup GB for the corresponding software environment 60, 60', 60". The platform-independent data contents X, Y, Z are stored in the generalized backup repository (GBR) 120. A second part includes platform-specific transformation rules TR(n,m) for related platform-independent data contents X, Y, Z, where n represents the platform-independent data content X, Y, Z, and m represents the corresponding platform A, B, C. The transformation rules TR(n,m) are used to convert the platform-independent data contents X, Y, Z in platform dependent data contents $X^A, Y^A, Z^A, X^B, Y^B, Z^B, X^C, Y^C, Z^C$. The transformation rules TR(n,m) are stored in the transformation rule repository (TRR) 130. The generalized backup manager (GBM) 110 maintains a list of available generalized backups 116 and utilizes a generalized backup prediction unit 112. The generalized backup prediction unit 112 of the generalized backup manager 110 forecasts potentially used and definitely used generalized backups GB in future software environments 60, 60', 60" using heuristic data of a corresponding heuristic data storage 114. The result is managed via a required generalized backup list 140. The list of available generalized backups 116 and the required generalized backup list 140 are an extension to prior art test management tools, e.g. test matrix.

The cloud manager 22 of the cloud server 20 creates the platform specific software environment 60, 60', 60" in the network environment 1 according to a software environment definition predefined by a user 3.1 using a cloud manager backup cloud enhancement 24. The generalized backup manager 110 of the backup storage 100 automatically creates the generalized backup GB of the software environment 60, 60', 60" by extracting the platform independent data X, Y, Z and the platform specific transformation rules TR(n,m). Additionally the generalized backup manager 110 automatically calculates enhanced metadata CONSPEC 30, describing the generalized backup GB; assigns the enhanced metadata CONSPEC 30 with the predefined software environment definition; and registers the generalized backup GB with the enhanced metadata CONSPEC 30 in the available backup storage list 116 accessible by a plurality of distributed users 3.1 connected via the cloud manager backup cloud enhancement 24 and the generalized backup manager 110. The cloud manager 22 creates a software environment 60, 60', 60" according to a predefined software environment definition by automatically checking the backup storage 100 for an available generalized backup GB by means 35, 36, 37 of the predefined software environment definition.

Figure 13:
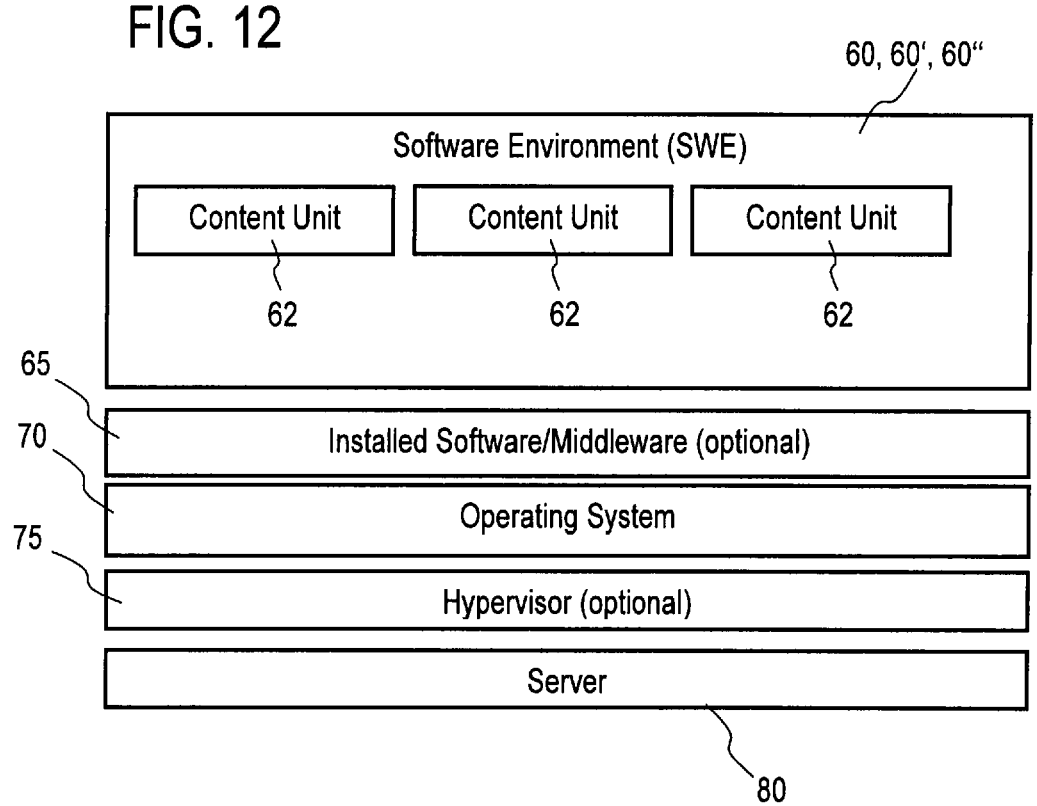
FIG. 13 is a schematic diagram of a software solution setup, in accordance with an embodiment of the present invention.

Referring to FIG. 8, the enhanced metadata 30 include information about intrinsic content units 62, shown in FIG. 13, of the software environment 60, 60', 60" and are defined as backup content specification CONSPEC containing a unique identifier ID 32 and the predefined software environment definition including a content descriptor 34 with a content identification Content_ID 35 and a variable length list of further refined content units 36 searchable during a content descriptor search. The content identification Content_ID 35 can include product name and release, for example. The variable length list of further refined content units 36 can comprise product components and level, for example. Additionally the content descriptor 34 can include a variable length list of user-defined parameters 37, e.g. data size of content.

The enhanced metadata 30 or the content specification CONSPEC is calculated from an existing software environment 60, 60', 60", where the content descriptor 34 either does not exist, or does not describe a similar enough existing content descriptor CONSPEC. Such the similar enough content descriptor CONSPEC can be compiled from the content identification Content_ID 35 and optionally from the content units 62 in the list of further refined content units 36 and/or optionally from the user-defined parameters of the list of user-defined parameters 37. In case, no enhanced metadata 30 or content specification CONSPEC is calculated, existing enhanced metadata 30 or content specification CONSPEC according with a reusable software environment 60, 60', 60" is available. In case, new enhanced metadata 30 or content specification CONSPEC is calculated, it is associated to the generalized backup GB of the software environment 60, 60', 60", and attached to the corresponding test definition in a test matrix 40, shown in FIG. 9. This use of the enhanced metadata 30 or the content specification CONSPEC makes the software environment 60, 60', 60" reusable according to an aspect of the present invention.

The generalized backup manager 110 uses a mapping list 150, where one platform-independent data content X, Y, Z of a corresponding generalized backup GB is assigned to at least one platform-specific transformation rule TR(n,m). Since the shown embodiment of the network environment 1 includes three different platforms A, B, C, each data content X, Y, Z of a corresponding generalized backup GB is assigned to three different platform-specific transformation rules TR(n,m). So each user 3.1 is able to startup each generalized backup GB on all platforms A, B, C of the network environment 1 independent on which platform A, B, C the software environment 60, 60', 60" was created first. In the shown embodiment, a first generalized backup GB with a first data content X for a first software environment 60 was created on platform A first, and a corresponding user 3.1 has initiated the creation of the first generalized backup GB on platform A. The generalized backup manager 110 has extracted the first platform-independent data content X and has created platform-specific transformation rules TR(X,A), TR(X,B) and TR(X,C). So the generalized backup manager 110 is able to provide platform-specific backups $X^A$, $X^B$, $X^C$ for the first software environment 60 on all platforms A, B, C of the network environment 1. Therefore the first platform-independent data content X can be used on all three platforms A, B, C to create the first software environment 60. A second generalized backup GB with a second data content Y for a second software environment 60' was created on platform B first, and a corresponding user 3.1 has initiated the creation of the second generalized backup GB on platform B. The generalized backup manager 110 has extracted the second platform-independent data content Y and has created platform-specific transformation rules TR(Y, A), TR(Y,B) and TR(Y,C). So the generalized backup manager 110 is able to provide platform-specific backups $Y^A$, $Y^B$, $Y^C$ for the second software environment 60' on all platforms A, B, C of the network environment 1. Therefore the second platform-independent data content Y can be used on all three platforms A, B, C to create the second software environment 60'. A third generalized backup GB with a third data content Z for a third software environment 60" was created on platform C first, and a corresponding user 3.1 has initiated the creation of the third generalized backup GB on platform C. The generalized backup manager 110 has extracted the third platform-independent data content Z and has created platform-specific transformation rules TR(Z,A), TR(Z,B) and TR(Z,C). So the generalized backup manager 110 is able to provide platform-specific backups $Z^A$, $Z^B$, $Z^C$ for the third software environment 60" on all platforms A, B, C of the network environment 1. Therefore the third platform-independent data content Z can be used on all three platforms A, B, C to create the third software environment 60".

Figure 3:
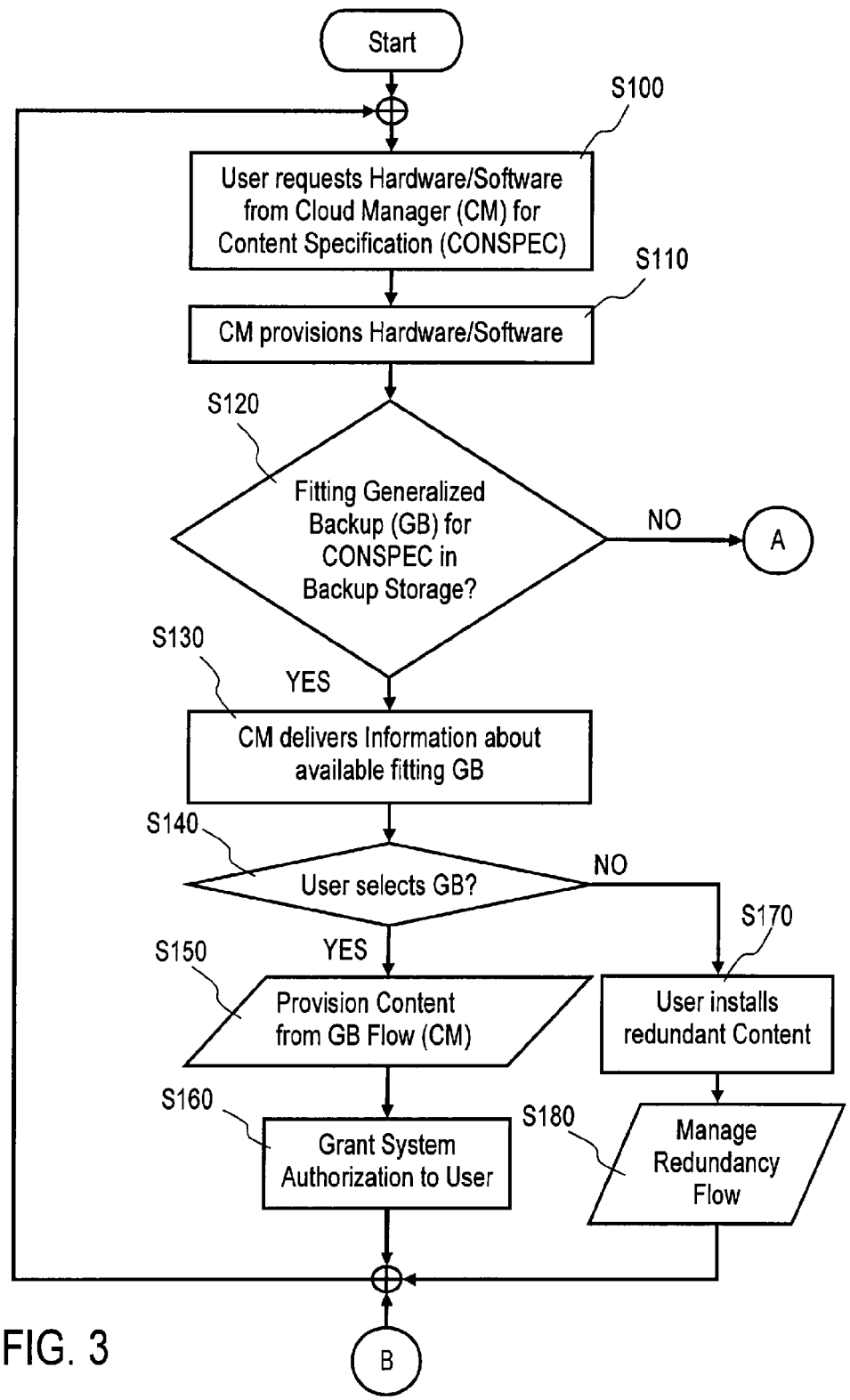
FIGS. 3 and 4 are a schematic system process overview, in accordance with an embodiment of the present invention.
Figure 4:
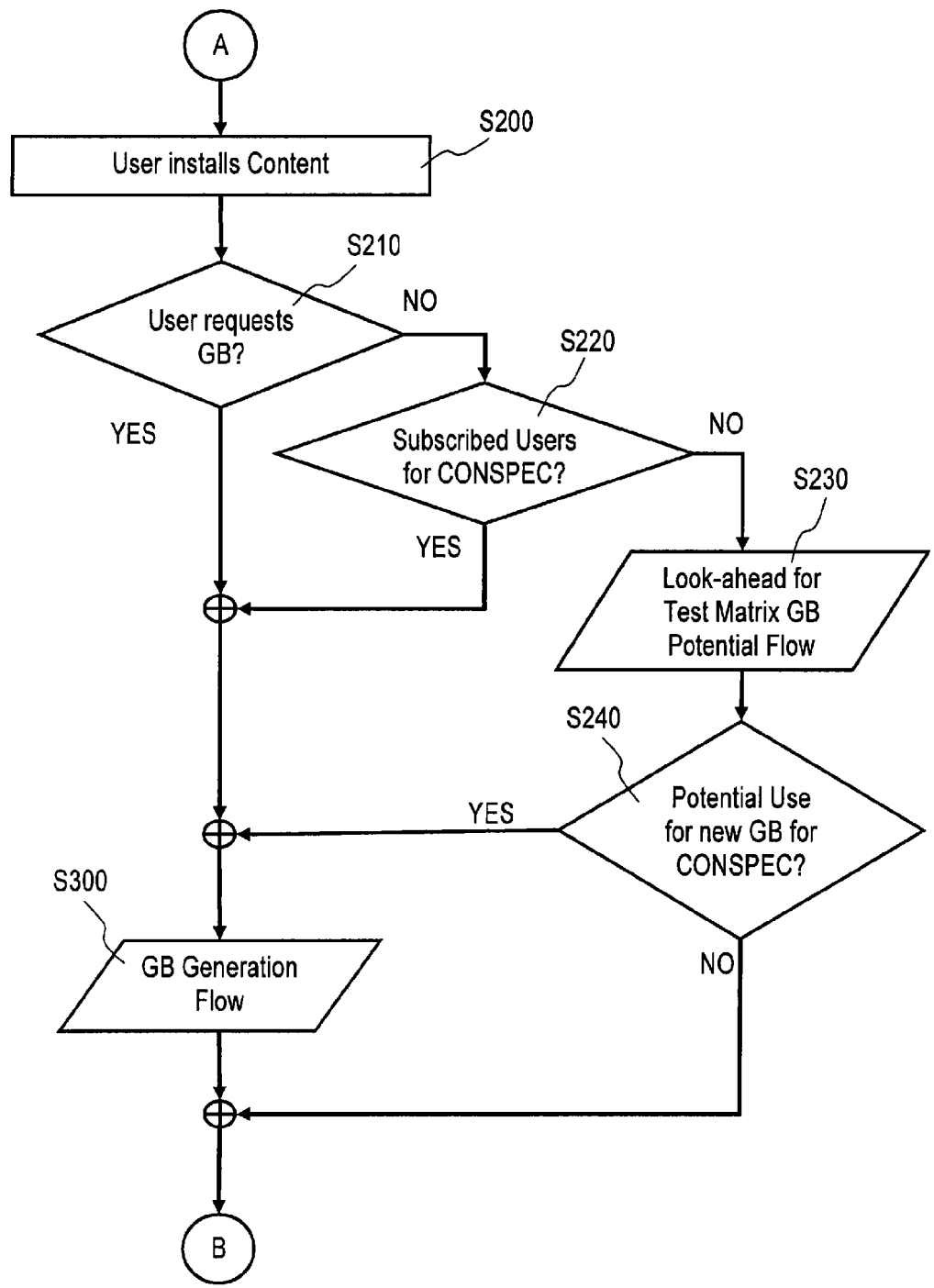

FIGS. 3 and 4 show a system process overview, in accordance with an embodiment of the present invention.

Referring to FIGS. 1 to 4, in step S100, the user 3.1 requests hardware/software from the cloud manager 22, according to enhanced metadata 30 or content specification CONSPEC. The flow diagram of FIGS. 3 and 4 shows an end-to-end process for setting up a test prerequisite. Alternative actions show the provisioning of the test prerequisite from an existing generalized backup GB, or the management of the installation of a redundant content, or the generation of a new generalized backup GB, or the installation of a new test prerequisite without generating a generalized backup GB of it.

In step S110, the cloud manager 22 provides the hardware/software to the user 3.1. In step S120 it is checked to determine if a generalized backup GB in the backup storage 100 fits the enhanced metadata 30 or the content identification Content_ID 35. If a generalized backup GB in the backup storage 100 fits the enhanced metadata 30 or the content identification Content_ID 35, cloud manager 22 delivers information about the available fitting generalized backup GB in step S130. If the user selects an available fitting generalized backup GB, step S140 goes to step S150. In step S150 the cloud manager 22 provides content from a generalized backup GB flow. In step S160 the cloud server 20 grants authorization to the user 3.1. If the user selects no generalized backup GB, step S140 goes to step S170. In step S170, the user installs redundant content and in step S180 the cloud server 20 manages the redundancy flow. There are different possibilities for the system to react on the users wish to create a redundant generalized backup GB. For example, the system can prevent the installation of the redundant generalized backup GB or allow the user 3.1 to install a redundant generalized backup GB with specific user parameters also added to the list of user parameters 37 as part of the content descriptor 34. So the user 3.1 is able to create a redundant generalized backup GB including specific data and/or a specific configuration.

If a generalized backup GB in the backup storage 100 does not fit the enhanced metadata 30 or the content identification Content_ID 35, the user installs content in step S200 of FIG. 4. In step S210 it is checked to determine if the user 3.1 requests a generalized backup GB. If the user 3.1 does not request a generalized backup GB, it is checked in step S220, if a user 3.1 is subscribed for the enhanced metadata 30 or the content specification CONSPEC. If the user is subscribed for the enhanced metadata 30 or the content specification CONSPEC the generalized backup GB generation process is performed in step S300. The generalized backup GB generation process in step S300 is also performed if the user 3.1 requests a generalized backup GB in step S210. After performing the generalized backup GB generation process the process returns to step S100 of FIG. 3.

If no user 3.1 is subscribed for the enhanced metadata 30 or the content specification CONSPEC, a look-ahead process for a potential generalized backup GB flow in the test matrix is performed in step S230. If a potential use of a new generalized backup GB for the enhanced metadata 30 or content specification CONSPEC is found, step S240 goes to step S300 and the generalized backup GB generation process is performed. If no potential use of a new generalized backup GB for the enhanced metadata 30 or content specification CONSPEC is found, step S240 goes to step S100 of FIG. 3. If the user 3.1 requests a generalized backup GB, the generalized backup GB generation process is performed in step S300 and after the generalized backup GB generation process in step S300 the process returns to step S100 of FIG. 3.

Figure 5:
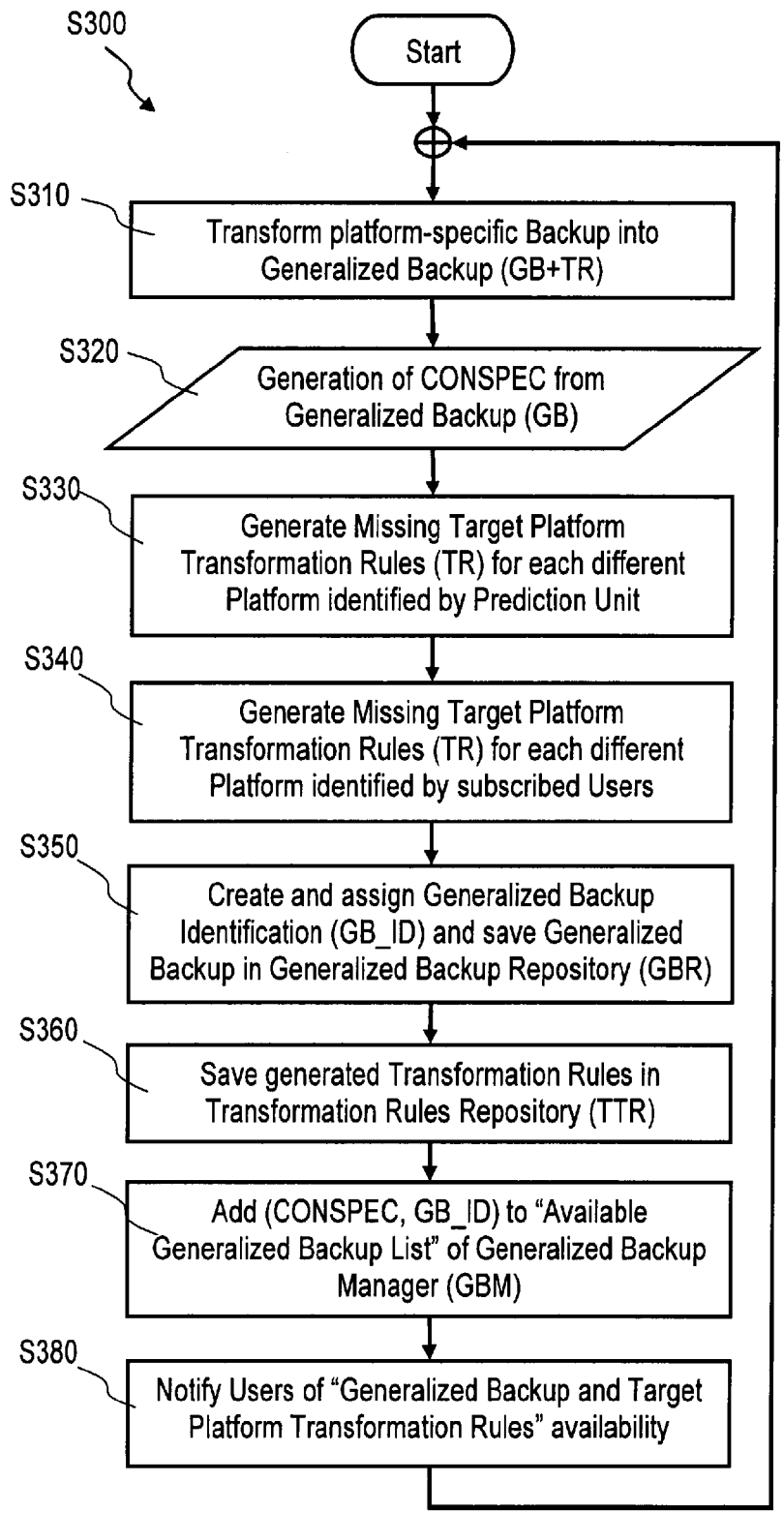
FIG. 5 is a schematic flow diagram of generalized backup generation, in accordance with an embodiment of the present invention.

FIG. 5 shows the generation of the generalized backup GB, in accordance with an embodiment of the present invention.

Referring to FIG. 5, the generalized backup GB generation of step S300 in FIG. 4 is defined by the steps 5310 to 5380 of FIG. 5. In step S310 the platform-specific backup $X^A$, $Y^A$, $Z^A$, $X^B$, $Y^B$, $Z^B$, $X^C$, $Y^C$, $Z^C$ is converted into a generalized backup GB. Therefore the platform-specific backup $X^A$, $Y^A$, $Z^A$, $X^B$, $Y^B$, $Z^B$, $X^C$, $Y^C$, $Z^C$ is read and separated into platform-independent data contents X, Y, Z and the initial transformation rule (TR(n,m)). Both are stored separately but related to each other in the mapping list 150. In step S320 the enhanced metadata 30 or the content specification CONSPEC is generated. In step S330 missing target platform transformation rules (TR(n,m)) for different potential and definite target platforms A, B, C identified by the prediction unit 112 are generated by the generalized backup manager 110. In step S340 missing target platform transformation rules (TR(n,m)) for different target platforms A, B, C identified by subscribed users 3.1 are generated by the generalized backup manager 110. In step S350 a generalized backup identification GB_ID is created and assigned and the generalized backup GB is saved in the generalized backup repository (GBR) 120. The generated transformation rules (TR) are saved in the transformation rules repository (TRR) 130 in step S360. In step S370, the generalized backup manager (GBM) 110 updates the available generalized backup list 116 with the new (CONSPEC, GB_ID) tuple. Finally, a notification is sent to the user 3.1 in Step S380 to notify the user 3.1 about the availability of the generalized backup GB and the target platform transformation rules (TR(n,m)).

Figure 6:
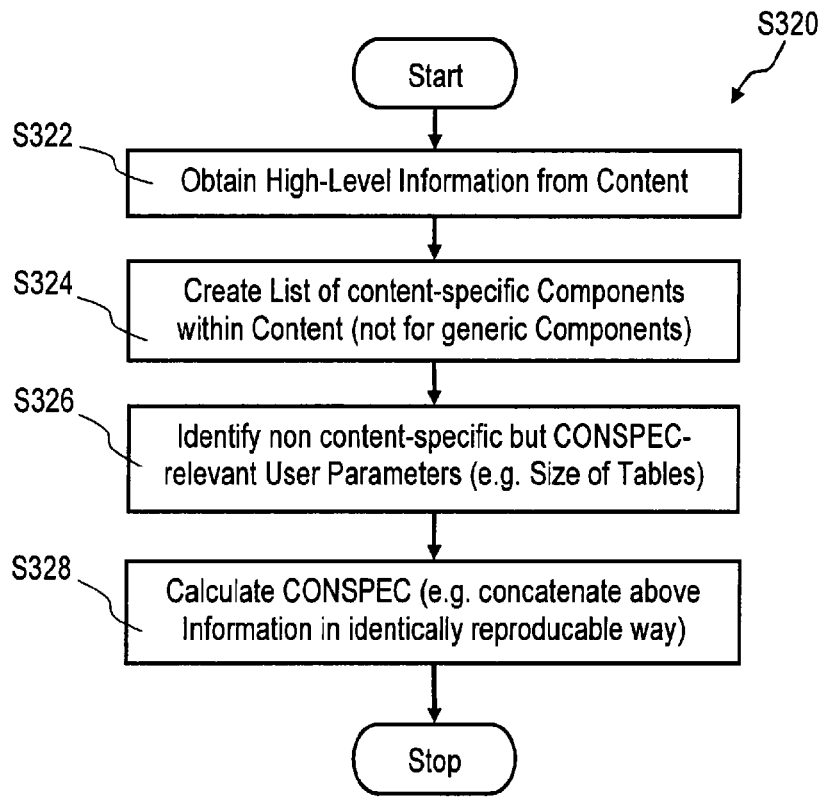
FIG. 6 is a schematic flow diagram of content specification (CONSPEC) generation, in accordance with an embodiment of the present invention.

FIG. 6 shows the generation of the enhanced metadata 30 or the content specification (CONSPEC), in accordance with an embodiment of the present invention.

Referring to FIG. 6, the generation of the enhanced metadata 30 or the content specification CONSPEC of step S320 in FIG. 5 is defined by the steps S322 to S328 of FIG. 6. In step S322 high-level information like product name, product release is obtained from the content. In step S324 content units as parts inside the content, not visible from the file system or any other outside location, are identified and placed in the list of content units 36 of the enhanced metadata 30 or content specification CONSPEC. That means the list of content units 36 is created with content-specific components within the content and without generic components. In step S326 non content-specific but relevant user parameters for the enhanced metadata 30 or content specification CONSPEC are identified and added to the list of user parameters 37 of the enhanced metadata 30 or content specification CONSPEC. In step S328, the enhanced metadata 30 or the content specification CONSPEC are calculated from the above concatenated information in an identically reproducible way.

Figure 7:
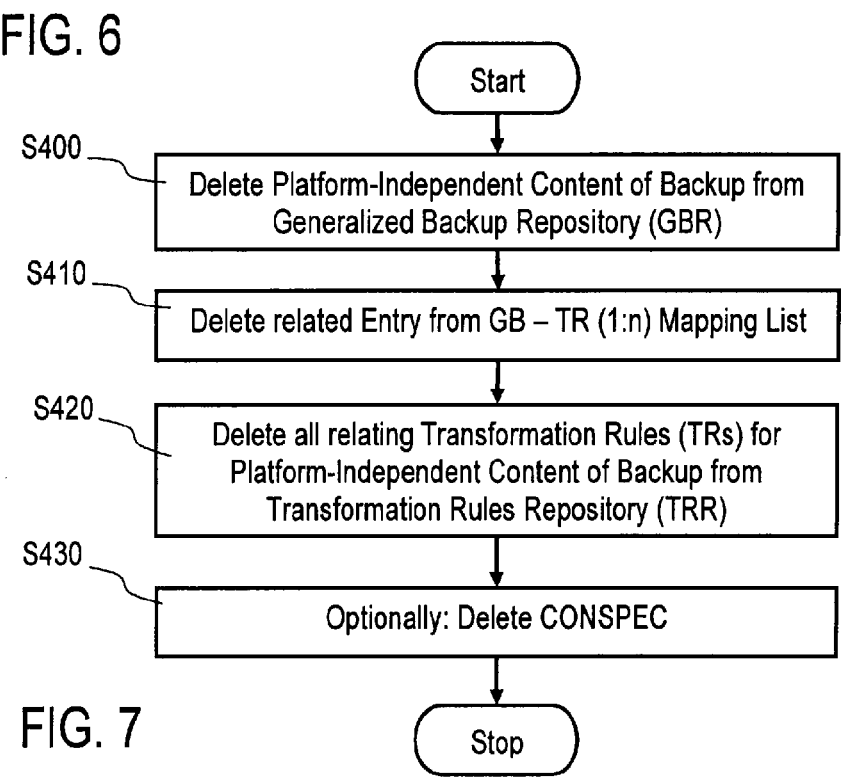
FIG. 7 is a schematic flow diagram of a generalized backup clean-up process, in accordance with an embodiment of the present invention.

FIG. 7 shows a generalized backup clean-up process, in accordance with an embodiment of the present invention.

Referring to FIG. 7, in step S400 the platform-independent data content X, Y, Z of the generalized backup GB is deleted from generalized backup repository (GBR) 120. In step S410 the relating entry in the mapping list 150 is deleted. In step S420 all relating transformation rules (TR (n,m)) for the platform-independent data content X, Y, Z of the generalized backup GB are deleted from the transformation rules repository (TRR) 130. Optionally, the enhanced metadata 30 or content specification CONSPEC of the generalized backup GB is deleted in step S430.

Figure 10:
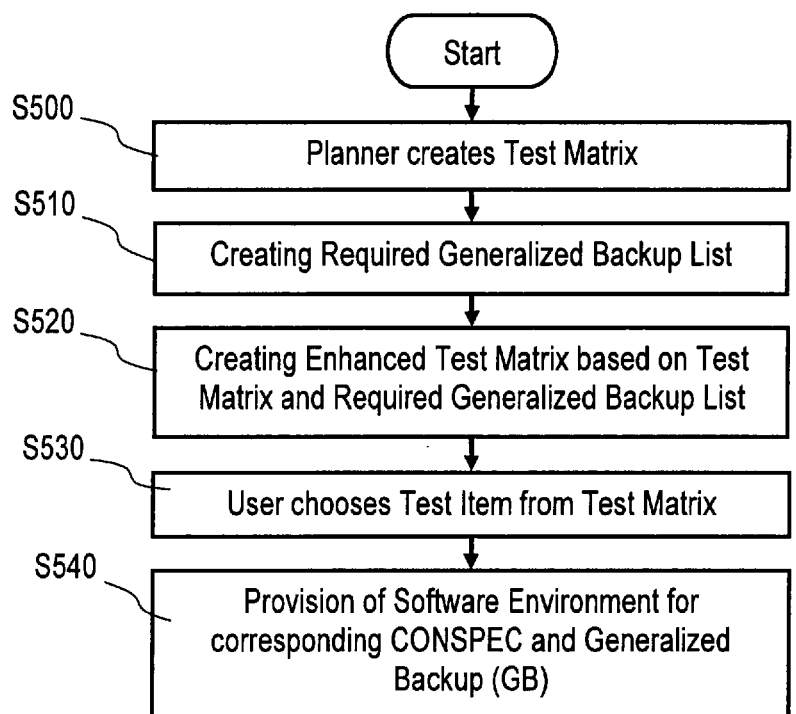
FIG. 10 is a schematic flow diagram of the creation and use of the enhanced test matrix, in accordance with an embodiment of the present invention.

FIG. 9 shows an enhanced test matrix 50, in accordance with an embodiment of the present invention; FIG. 10 shows the creation and use of the enhanced test matrix 50, in accordance with an embodiment of the present invention; and FIG. 11 shows the update of the enhanced test matrix 50, in accordance with an embodiment of the present invention.

Referring to FIG. 9, the prior art test matrix 40 including a list of test items assigned to corresponding software environment definitions is extended by the required generalized backup list 140 to form the enhanced test matrix 50.

Referring to FIG. 10, in step S500 a test planner creates the test matrix 40. In step S510 the required generalized backup list 140 is automatically created. The required generalized backup list 140 includes a list of search arguments and corresponding enhanced metadata 30 or content specification CONSPEC containing the search argument a "Wait for CONSPEC" flag, where enhanced metadata 30 or content specification CONSPEC entry points to a generalized backup GB. In step S520, the enhanced test matrix 50 is created based on the test matrix 40 and the required generalized backup list 140. In step S530 the user 3.1 chooses a test item from the test matrix 40. In step S540, the software environment 60, 60', 60" for the corresponding enhanced metadata 30 or content specification CONSPEC and the generalized backup GB is provided to the user 3.1.

Figure 11:
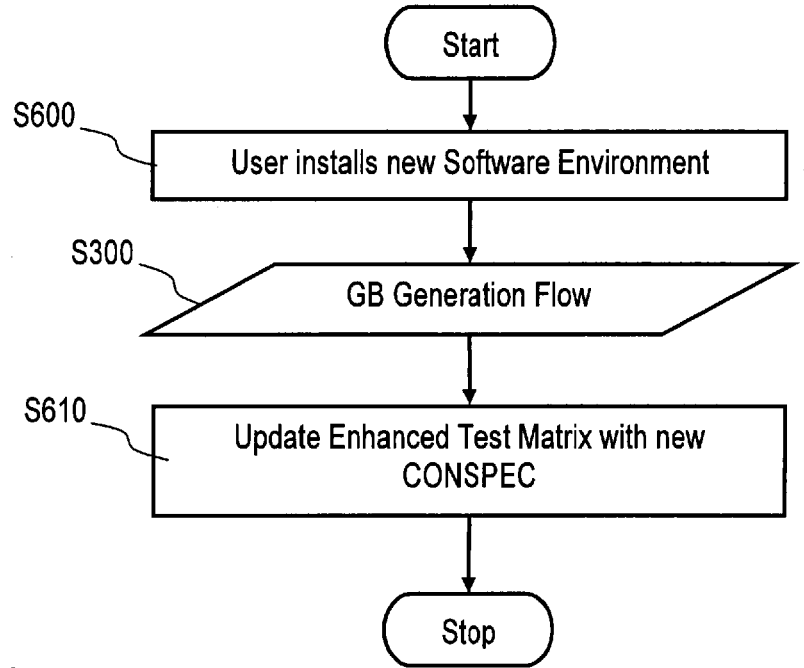
FIG. 11 is a schematic flow diagram of the update of the enhanced test matrix, in accordance with an embodiment of the present invention.

Referring to FIG. 11, the user 3.1 installs a new test prerequisite, i.e. a new software environment 60, 60', 60", and the generalized backup manager (GBM) 110 creates an generalized backup GB of it in step S300 and stores the new generalized backup GB in the backup storage 100 and updates the available generalized backup list 116 with the new generalized backup identification GB_ID and the new enhanced metadata 30 or content specification CONSPEC. In step S610, the new enhanced metadata 30 or content specification CONSPEC replaces all corresponding "Wait for CONSPEC" flags in the required generalized backup list 140.

Figure 12:
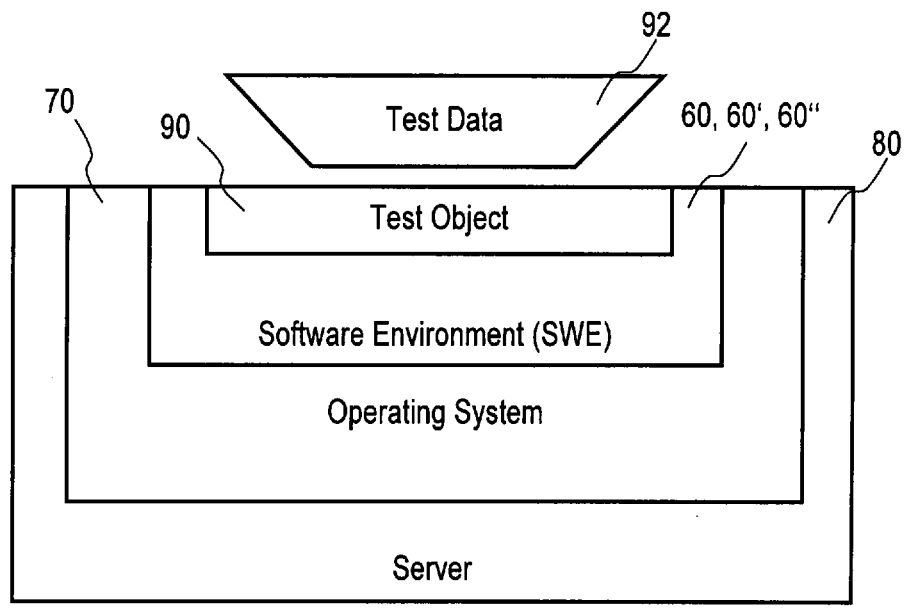
FIG. 12 is a schematic diagram of a scope of the invention.

FIG. 12 outlines the field where a software environment (SWE) 60, 60', 60" in the sense of an aspect of the present invention resides. Referring to FIG. 12, a server 80 running a corresponding operating system 70 uses the software environment (SWE) 60, 60', 60" for testing test objects 90 using test data 92. The software environment 60, 60', 60" could also be extended to cover also operating system modifications or the complete operating system 70.

FIG. 13 shows from bottom to top a usual software solution setup. At the bottom the server 80, on top of the server 80 a hypervisor 75 is optionally placed. On top of the hypervisor 75 the operating system 70 is placed and on top the operating system 70 optional software/middleware 65 is installed. On top of the software/middleware 65 the software environment 60, 60', 60" is placed. Prior art metadata are derived from information in the file system; the enhanced metadata 30 according to embodiments of the present invention can only be retrieved through the software environment 60, 60', 60" itself by means which the software environment provides. Prior art metadata contain software stack information about the hypervisor 75, the operating system 70 and the software/middleware 65 as source for virtual images. The software environment 60, 60', 60" as source for the generalized backup GB contain information about intrinsic content units 62 as enhanced metadata 30 or content specification CONSPEC. The enhanced metadata 30 or content specification CONSPEC are not available through the file system.

As described herein, in one aspect, a method is provided that includes, for instance, creating a platform specific software environment according to a predefined software environment definition by a user in the network environment; automatically creating a generalized backup of the software environment by extracting platform independent data contents and platform specific transformation rules; automatically calculating enhanced meta data describing the generalized backup; assigning the enhanced metadata with the predefined software environment definition; registering the generalized backup with the enhanced metadata in a backup storage accessible by a plurality of distributed users connected via the network environment, creating a software environment according to a predefined software environment definition by automatically checking the backup storage for an available generalized backup by means of the predefined software environment definition.

In further embodiments, one platform independent data content of a corresponding generalized backup is assigned to at least one platform specific transformation rule.

In further embodiments, the enhanced metadata include information about intrinsic content units of the software environment.

In further embodiments, the enhanced metadata are defined as backup content specification including a unique identifier and the predefined software environment definition including a content descriptor with a content identification and a variable length list of further refined content units searchable during a content descriptor search.

In further embodiments, the content descriptor includes a variable length list of user-defined parameters.

In further embodiments, an enhanced test matrix including a test matrix and a required generalized backup list are used for provisioning of the software environment for the enhanced metadata and the generalized backup.

In further embodiments, the enhanced test matrix is updated with enhanced metadata based on a new installed software environment.

In another embodiment, a system for backup management of software environments in a distributed network environment includes a cloud server and a backup storage managed by a corresponding backup server; wherein a cloud manager of the cloud server creates a platform specific software environment in the network environment according to a software environment definition predefined by a user using a cloud manager backup cloud enhancement; wherein a generalized backup manager of the backup storage automatically creates a generalized backup of the software environment by extracting platform independent data contents and platform specific transformation rules; wherein the generalized backup manager automatically calculates enhanced meta data describing the generalized backup; assigns the enhanced metadata with the predefined software environment definition; and registers the generalized backup with the enhanced metadata in an available backup storage list accessible by a plurality of distributed users connected via the cloud manager backup cloud enhancement and the generalized backup manager, wherein the cloud manager creates a software environment according to a predefined software environment definition by automatically checking the backup storage for an available generalized backup by means of the predefined software environment definition.

In further embodiments, the platform independent data contents of corresponding generalized backups are stored in a generalized backup repository of the backup storage.

In further embodiments, the platform specific transformation rules are stored in a transformation rules repository of the backup storage.

In further embodiments, one platform independent data content of a corresponding generalized backup is assigned to at least one platform specific transformation rule.

In further embodiments, the generalized backup manager includes a generalized backup prediction unit forecasting generalized backups potentially used in future software environments.

In further embodiments, the generalized backup prediction unit creates a required generalized backup list.

In another embodiment, a data processing program for execution in a data processing system includes software code portions for performing a method for backup management of software environments in a distributed network environment when the program is run on the data processing system.

In yet another embodiment, a computer program product stored on a computer-usable medium, includes computer-readable program means for causing a computer to perform a method for backup management of software environments in a distributed network environment when the program is run on the computer.

All in all, embodiments avoid redundant backups of databases for software testing across different platforms in a distributed network environment. Further, embodiments of the present invention enable large scale reuse of existing prerequisite setups, purposeful creation of generalized backups by minimized redundancy in backup creation and disk space usage. The generalized backup is created in a way that it is deployable not only on a system platform of the same type the generalized backup was created, but also on target platforms of any other system platform type. This allows for backup reuse within a team and across different teams.

One or more aspects relate to an improved test infrastructure for software. Prior art solutions describe that each test person configures his private test environment and creates the backup of it. That consumes much storage and test preparation work. This applies for all individual test persons of a test team. Embodiments of aspects of the present invention provide an improved test infrastructure which consists of a component for generating platform independent generalized backup and transformation rules based on a specific target platform the generalized backup should be used in the future. A component for notifying all test persons about availability of the platform independent generalized backups and a component for creating a unique identifier for the platform independent generalized backups for identifying available platform independent generalized backups are provided.

Further, one or more aspects introduce the unique backup content identifier as enhanced metadata. The unique backup content identifier allows for similarity determination between generalized backups based on intrinsic data of the generalized backup, wherein the intrinsic data is not retrievable by usual means, e. g. by examination of the file-system representation like size, name, etc., or registry information of an installed software product. The unique backup content identifier is the underlying means to build a communication, house-keeping and management system to support described functionality and characteristics of large scale reuse and minimized disk space consumption.

In contrast to prior art solutions, from a software environment (SWE) point of view according to embodiments of aspects of the present invention, the lower level parts of the software environment are irrelevant for similarity identification. Since prior art solutions do not address this fact, prior art solutions must take care of different target environments and thus store more and larger virtual images for the same or similar relevant software environment (SWE). Further, prior art metadata are based on information available through the file system within the virtual image. This method does not provide information about content units within a software environment (SWE), e.g. within an SAP solution, since they are not available through the file system, e.g. SAP solution components are stored in its database together with the business data.

In contrast, embodiments of aspects of the present invention introduce enhanced metadata derived from the software environment (SWE) and its content units. In the present description, the enhanced metadata are also referred to as content specification. Embodiments of aspects of the present invention utilize the content specification or enhanced metadata to determine similarity between two software environments (SWE) by comparing the corresponding content specification or enhanced metadata of each software environment (SWE).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of backup management of software environments in a distributed network environment comprising:
    creating, by one or more processors in the distributed environment, on a first platform, a platform specific software environment for testing software in the distributed network environment, the platform specific software environment indicating a combination of hardware and software in the distributed network environment;
    obtaining, by the one or more processors, the platform specific software environment for testing in the distributed network environment;
    automatically creating, by the one or more processors, a generalized backup of the platform specific software environment, the generalized backup comprising platform independent data contents and platform specific transformation rules;
    ascertaining, by the one or more processors, that the generalized backup is not discovered in an available generalized backup list stored in a backup storage accessible by a plurality of distributed users connected via the distributed network environment and is therefore reusable for testing the platform independent data contents in respective platforms of the distributed network environment; and
    based on the ascertaining, utilizing, by the one or more processors, the generalized backup, for testing the software in the distributed network environment on a second platform, wherein the second platform is different from the first platform.

2. The method according to claim 1, the automatically creating the generalized backup comprising:
    extracting by the one or more processors, the platform independent data contents from the generalized backup;
    creating by the one or more processors, a first platform specific transformation rule of the platform specific transformation rules, the first platform specific transformation rule associating the platform independent data contents with the first platform;
    automatically calculating a content specification describing the platform independent data contents, the content specification identified by a unique identifier; and
    registering a first association of the content specification with the platform independent data contents, represented by one or more pair of the unique identifier and the general backup identification in the available generalized backup list of the backup storage, such that the platform independent data contents are searchable by use of the content specification by the plurality of distributed users for testing respective software environment of the software environments.

3. The method according to claim 2, wherein the content specification further comprises information about content units of the platform specific software environment.

4. The method according to claim 3, wherein the content specification is defined as backup content specification, and the predefined software environment definition is represented by a content descriptor comprising a content identification and a variable length list of further refined content units of the platform specific software environment searchable during a content descriptor search.

5. The method according to claim 4, wherein the content descriptor further comprises a variable length list of user-defined parameters.

6. The method according to claim 5, wherein an enhanced test matrix comprising a test matrix and a required generalized backup list are used for provisioning of the platform specific software environment for the content specification and the platform independent data contents, wherein the test matrix comprises one or more test item and one or more software environment definition respectively corresponding to the one or more test item, and wherein the required generalized backup list comprises one or more search argument and one or more content specification respectively corresponding to each of the one or more search argument.

7. The method according to claim 6, wherein the enhanced test matrix is updated with a new content specification based on a new generalized backup of a second platform specific software environment indicating a new software environment for testing, responsive to the new software environment being installed in the distributed network environment.

* * * * *